(12) United States Patent
Boucher et al.

(10) Patent No.: US 10,421,015 B2
(45) Date of Patent: Sep. 24, 2019

(54) GAME SYSTEM, DEVICE AND RECORDING MEDIUM

(71) Applicant: GREE, INC., Tokyo (JP)

(72) Inventors: Robin Akira Boucher, Tokyo (JP); Jason Parrott, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 15/687,709

(22) Filed: Aug. 28, 2017

(65) Prior Publication Data

US 2017/0354881 A1  Dec. 14, 2017

Related U.S. Application Data

(63) Continuation of application No. 14/416,149, filed as application No. PCT/JP2013/070368 on Jul. 26, 2013, now Pat. No. 9,744,456.

(30) Foreign Application Priority Data

Jul. 27, 2012  (JP) ................................ 2012-167561

(51) Int. Cl.
A63F 13/30 (2014.01)
A63F 13/493 (2014.01)
(Continued)

(52) U.S. Cl.
CPC ............ *A63F 13/493* (2014.09); *A63F 13/12* (2013.01); *A63F 13/35* (2014.09); *A63F 13/60* (2014.09);
(Continued)

(58) Field of Classification Search
None
See application file for complete search history.

(56) References Cited

U.S. PATENT DOCUMENTS 6,406,371 B1  6/2002  Baba et al.
7,771,271 B2  8/2010  Walker
(Continued)

FOREIGN PATENT DOCUMENTS

JP  2002-306854 A  10/2002
JP  2008-154620 A  7/2008
(Continued)

OTHER PUBLICATIONS

International Search Report dated Oct. 29, 2013 in PCT/JP2013/070368 filed Jul. 26, 2013.
(Continued)

*Primary Examiner* — Ronald Laneau
(74) *Attorney, Agent, or Firm* — Oblon, McClelland, Maier & Neustadt, L.L.P.

(57) ABSTRACT

Each client device sends an acquisition request the input of which has been accepted and writes, in a second storage unit, status information and a revision number received from a server device. After restoring the status of a game based on the status information in the second storage unit, the client device advances the game. During the advancement of the game, each client device sends, based on an instruction the input of which has been accepted, sends to the server device an update request including status information indicating the present status of the game as well as account information and the revision number of the second storage unit. The server device, based on account information included in the update request, determines whether the revision number read out from the first storage unit and the revision number in the update request match each other. If the numbers match, the server device updates the status information and the revision number in the first storage unit based on the update request. If the numbers do not match, the server device cancels the update request.

14 Claims, 7 Drawing Sheets

(51) Int. Cl.
*A63F 13/79* (2014.01)
*A63F 13/35* (2014.01)
*A63F 13/73* (2014.01)
*A63F 13/77* (2014.01)
*H04L 29/08* (2006.01)
*H04L 29/06* (2006.01)
*A63F 13/60* (2014.01)

(52) U.S. Cl.
CPC .............. *A63F 13/73* (2014.09); *A63F 13/77* (2014.09); *A63F 13/79* (2014.09); *H04L 67/28* (2013.01); *H04L 67/38* (2013.01); *A63F 2300/552* (2013.01)

(56) References Cited

U.S. PATENT DOCUMENTS

| | | |
|---|---|---|
| 7,850,522 B2 | 12/2010 | Walker |
| 8,734,233 B2 | 5/2014 | Walker |
| 8,784,188 B2 | 7/2014 | Walker |
| 2014/0018099 A1* | 1/2014 | Kami ................... H04W 64/00 455/456.1 |
| 2014/0082066 A1* | 3/2014 | Inui ....................... G06F 9/4843 709/203 |
| 2014/0244788 A1* | 8/2014 | Resch ................. H04L 67/1097 709/217 |

FOREIGN PATENT DOCUMENTS

| | | |
|---|---|---|
| JP | 2009-112587 A | 5/2009 |
| JP | 4371183 B2 | 11/2009 |
| JP | 2010-233791 A | 10/2010 |
| JP | 2012-71150 A | 4/2012 |

OTHER PUBLICATIONS

International Preliminary Report on Patentability with Written Opinion dated Jan. 27, 2015 in PCT/JP2013/070368 (English Translation only).

Japanese Office Action dated Jan. 21, 2016 in corr. Japanese Patent Application No. 2015-216689, filed Nov. 4, 2015 (w/ computer-generated English translation) [citing document(s) AO therein] 7 pp.

* cited by examiner

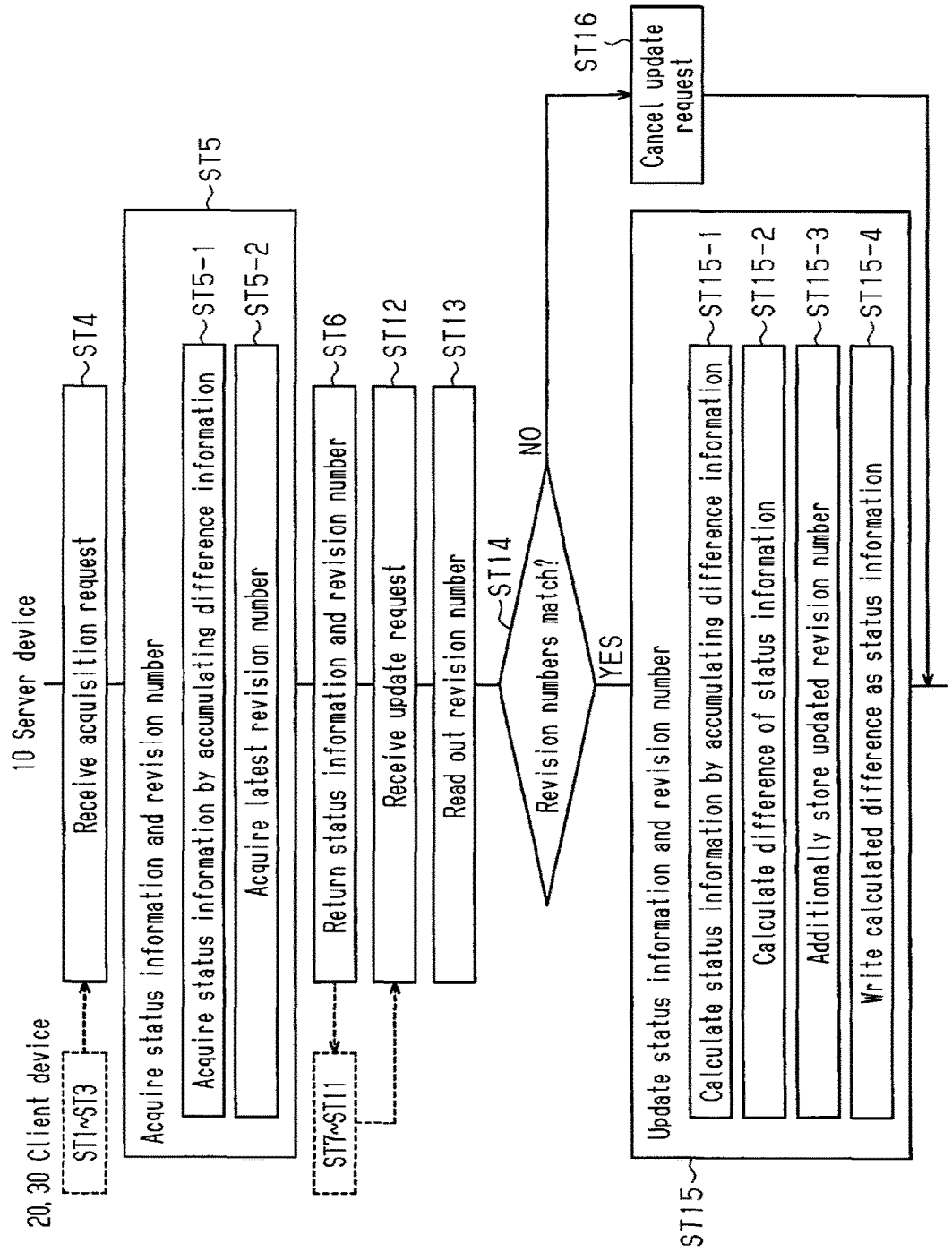

GAME SYSTEM, DEVICE AND RECORDING MEDIUM

CROSS-REFERENCE TO RELATED APPLICATIONS

The present application is a continuation application which claims the benefit of priority under 35 U.S.C. § 120 of U.S. patent application Ser. No. 14/416,149, filed May 4, 2015, which is a National Stage Entry of PCT/JP2013/070368, filed Jul. 26, 2013, and claims priority to Japanese application no. 2012-167561, filed Jul. 27, 2012; the entire contents of each of which are incorporated herein by reference.

The present invention relates to a game system, a device, and a storage medium.

BACKGROUND

In recent years, game systems have been widely known that include a server device in which game programs are stored and a client device that executes a desired game program downloaded from the server device. The client device may be any device as long as the device can execute the program. For example, a desktop or laptop personal computer, a cellular phone, a smart phone, a tablet terminal, and the like are used as needed.

There are many types of game programs including a program that is completed in a short time such as a card game and a program that is not completed in one day such as a role-playing game. A user operates the client device as necessary and plays the game in response to the game program executed by the client device.

Further, in a case of executing a game program that is not completed in one day, the client device stops advancement of the game in response to an operation by the user. At a later date, the user operates the client device and restarts the game from the stopped state (for example, refer to Patent Document 1).

PRIOR ART DOCUMENTS

Patent Documents

Patent Document 1: Japanese Laid-Open Patent Publication No. 2010-233791

SUMMARY

The game system as described above usually has no problems. However, according to examination by the present inventors, there is room for improvement as described below.

That is, some users demand to alternately use a plurality of client devices such as a smart phone and a tablet terminal and continuously execute a game between the respective client devices. Such users also demand to continuously execute the game through parallel execution by the respective client devices. The parallel execution refers to such a situation where, for example, while the game is being executed in one client device, the game is also restarted in another client device, and the game is stopped in the first client device without stopping the game in the second client device.

However, the conventional game systems are not based on the assumption that the game is continuously executed between the respective client devices. Also, in particular, the conventional game systems are not at all based on the assumption that the game is continuously executed through parallel execution by the respective client devices.

Therefore, in the conventional game systems, there is room for improvement from the viewpoint of meeting these unexpected demands.

An objective of the present invention is to provide a game system, a device, and a storage medium with which a game can be continuously executed between respective client devices.

Further, another objective of the present invention is to provide a game system, a device, and a storage medium with which a game can be continuously executed through parallel execution by respective client devices.

In accordance with one aspect of the present invention, a game system is provided that includes a plurality of client devices capable of individually advancing a game in response to an operation by a user and a server device capable of communicating with each of the client devices. The server device includes a first storage unit that stores status information on a status of the game, account information of the user, and a revision number of the status information, while relating these to one another, a unit that receives an update request including status information, account information, and a revision number from each of the client devices, a unit that reads out a revision number in the first storage unit based on the account information in the update request, a unit that determines whether the read-out revision number and the revision number in the update request match each other, an update unit that updates the revision number and the status information in the first storage unit based on the update request in a case where the numbers match each other as a result of the determination, a unit that cancels the update request in a case where the numbers do not match as a result of the determination, an acquisition unit that acquires, when receiving an acquisition request including account information from each of the client devices, status information and a revision number from the first storage unit based on the account information in the acquisition request, and a unit that returns the acquired status information and the revision number to the source of the acquisition request. Each of the client devices includes a second storage unit into which the status information, the account information, and the revision number are written, a unit that accepts input of an acquisition request including account information of the user, a unit that writes, into the second storage unit, the account information included in the acquisition request the input of which has been accepted, and sends the acquisition request to the server device, a unit that writes status information and a revision number received from the server device into the second storage unit in response to sending of the acquisition request, a unit that advances the game after restoring the status of the game based on the status information in the second storage unit, a unit that accepts input of an instruction to store the status of the game during advancement of the game, and a unit that sends, to the server device, an update request including the account information and the revision number in the second storage unit and the status information on a current status of the game based on the instruction the input of which has been accepted.

As described above, according to the present invention, the game can be continuously executed between the respective client devices. According to the present invention, the game can be continuously executed through parallel execution by the respective client devices.

BRIEF DESCRIPTION OF THE DRAWINGS

FIG. 9 is a sequence diagram for illustrating operations in the same embodiment.

DETAILED DESCRIPTION OF THE PREFERRED EMBODIMENT

Hereinafter, respective embodiments of the present invention will be described using the drawings. The following devices can be respectively implemented by either a hardware configuration or a combination configuration of a hardware resource and software. As the software of the combination configuration, a program is used that is preliminarily installed into respective computers from a network or non-transitory computer-readable storage media M1 to M3 and executed by processors of the respective computers so as to have the computers realize functions of the respective devices.

First Embodiment

Figure 1:
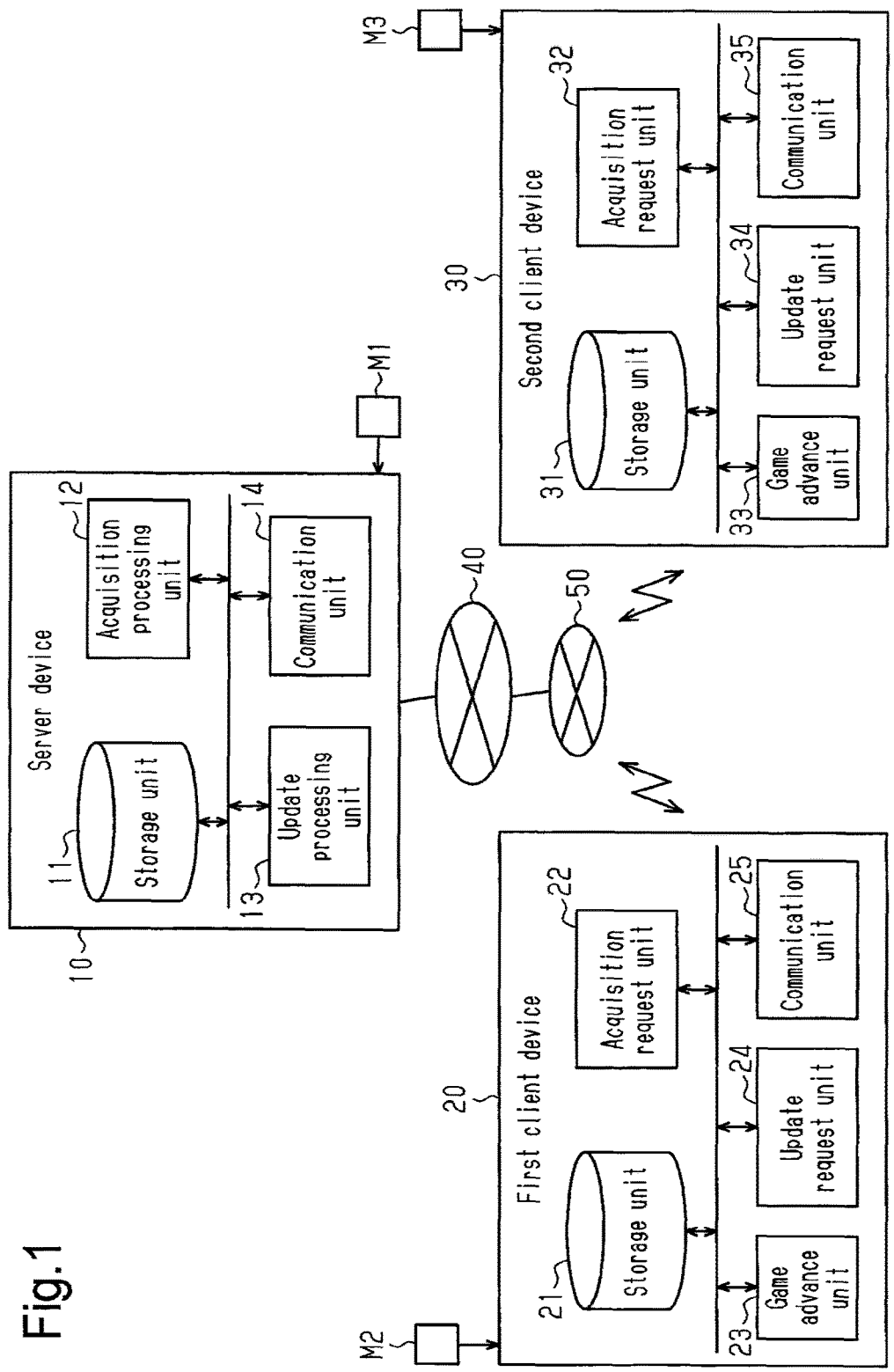
FIG. 1 is a schematic diagram showing a configuration of a game system according to a first embodiment of the present invention.
Figures 2, 3, 4:
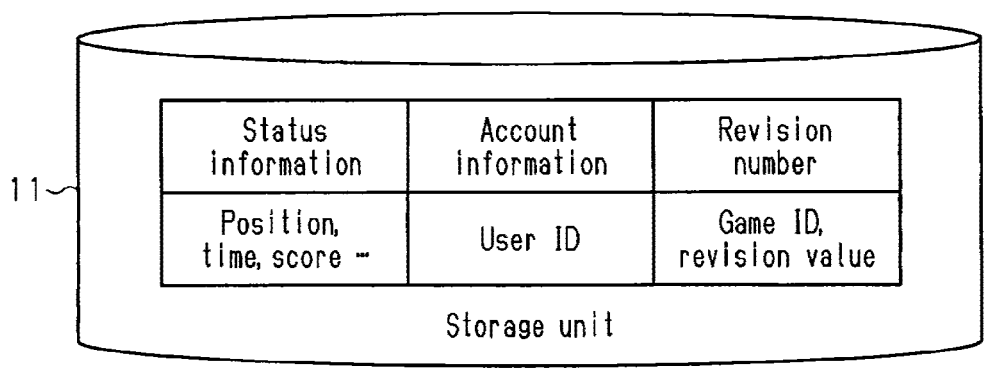
FIG. 2 is a schematic diagram for illustrating a storage unit of a server device in the same embodiment.
FIG. 3 is a schematic diagram for illustrating an acquisition request in the same embodiment.
FIG. 4 is a schematic diagram for illustrating an update request in the same embodiment.

FIG. 1 is a schematic diagram showing a configuration of a game system according to a first embodiment of the present invention. FIG. 2 is a schematic diagram for illustrating a storage unit of a server device. FIGS. 3 and 4 are schematic diagrams for illustrating respective requests. This game system includes a server device 10, and a plurality of client devices 20, 30 capable of individually advancing a game in response to an operation by a user. The respective devices 10, 20, 30 can communicate with each other via a computer network 40 and a mobile communication network 50. As the computer network 40, an arbitrary network can be applied as long as the network can provide communication between computers, and the Internet is used here. As the mobile communication network 50, an arbitrary network can be applied as long as the network can provide communication of the computer serving as a mobile communication device such as a cellular phone, a smart phone, and a tablet terminal. The first client device 20 is, for example, a tablet terminal such as iPad (Registered Trademark) in which an operating system such as iOS is used. The second client device 30 is, for example, a smart phone in which an operating system such as Android (Registered Trademark) is used. Although the respective client devices 20, 30 are mobile communication devices in this example, the client devices are not limited to these. Any one or both of the client devices may be a stationary computer like a desktop personal computer. Although the respective client devices 20, 30 use different operating systems in this example, the client devices are not limited to these and may use the same operating system. That is, although the respective client devices 20, 30 use different platforms from each other in this example, the client devices are not limited to these and may use the same platform. Although the client devices 20, 30 are two devices in this example, the client devices are not limited to these and may be three devices or more.

The server device 10 includes a storage unit 11, an acquisition processing unit 12, an update processing unit 13, and a communication unit 14.

The storage unit 11 is a storage device from which data is readable by and into which data is writable by the respective units 12 to 14. As shown in FIG. 2, the storage unit 11 stores status information on a status of the game, account information of the user, and a revision number of the status information, while relating these to one another.

The status information includes data indicating statuses such as a position of a character in the game, time, and a score in order to restart the game from the point of time of stopping the game. Specific data of the status information is different depending on the game. Thus, the status information is not limited to the data such as the position, the time, and the score shown as examples. Further, the status information may exclude information on a platform so as not to depend on the platforms of the respective client devices 20, 30. For example, the status information may exclude information on an operating system so as not to depend on the operating systems of the respective client devices 20, 30.

The account information is information to identify the user, and a user ID is used in this example. However, the account information is not limited to this. As long as the information can identify the user, the user ID and a password may be used or the user ID and biological information of the user may be used.

The revision number is a number to be updated whenever the status information is updated, which is a number including a game ID and a revision value in this example. The revision number is updated, for example, by fixing the game ID and updating the revision value. The game ID may be omitted in a case where the game is identified by some means such as a case where there is only one game. The game ID may be omitted from the revision number and the game ID may be related to the revision number (revision value), the status information, and the account information. Update of the revision number is an increase in the revision value in this example. However, the update is not limited to this and may be a decrease in the revision value. The revision value is not necessarily increased by +1 but may be increased by an arbitrary value such as by +2 and +10. The same is applied to a case of the decrease. An initial value of the revision number is not limited to "1" but may be an arbitrary value such as "0" and "100."

The acquisition processing unit 12 has the following respective functions (f12-1) and (f12-2) as shown in FIG. 3.

(f12-1) Acquisition function of, when an acquisition request rq1 including the account information is received from each of the client devices 20, 30, acquiring the status information and the revision number from the storage unit 11 based on the account information in the acquisition request rq1.

(f12-2) Function of returning the acquired status information and the revision number to the source of the acquisition request rq1.

The update processing unit 13 has the following respective functions (f13-1) to (f13-5) as shown in FIG. 4.

(f13-1) Function of receiving an update request rq2 including the status information, the account information, and the revision number from each of the client devices.

(f13-2) Function of reading out the revision number in the storage unit 11 based on the account information in the update request rq2.

(f13-3) Function of determining whether the read-out revision number and the revision number in the update request rq2 match each other.

(f13-4) Update function of updating the revision number and the status information in the storage unit 11 based on the update request rq2 in a case where the numbers match each other as a result of the determination.

(f13-5) Function of cancelling the update request rq2 in a case where the numbers do not match as a result of the determination.

The communication unit 14 is a communication function unit for communicating with the respective client devices 20, 30 via the computer network 40 and the mobile communication network 50.

Successively, configurations of the first and second client devices 20, 30 will be described. In the respective client devices 20, 30, function blocks relating to the present embodiment have the same configurations excluding installation configurations such as the operating systems and the platforms described above. Therefore, the first client device 20 will be described here as a representative example. The following description of the first client device 20 can be read as the description of the second client device 30 by changing the number in the tens place of the reference numeral from "2" to "3."

The first client device 20 includes a storage unit 21, an acquisition request unit 22, a game advance unit 23, an update request unit 24, and a communication unit 25.

The storage unit 21 is a storage device from which data is readable by and into which data is writable by the respective units 22 to 25. The status information, the account information, and the revision number are written into the storage unit 21.

The acquisition request unit 22 has the following functions (f22-1) and (f22-2).

(f22-1) Function of accepting input of the acquisition request including account information of the user, and function of writing, into the storage unit 21, the account information included in the acquisition request the input of which has been accepted and sending the acquisition request to the server device 10.

(f22-2) Function of writing the status information and the revision number received from the server device 10 into the storage unit 21 in response to sending of the acquisition request.

The game advance unit 23 has a function of advancing the game after restoring the status of the game based on the status information in the storage unit 21.

The update request unit 24 has the following respective functions (f24-1) to (f24-2).

(f24-1) Function of accepting input of an instruction to store the status of the game during advancement of the game.

(f24-2) Function of sending the update request including status information on a current status of the game and the account information and the revision number in the storage unit 21 to the server device 10 based on the instruction the input of which has been accepted.

The communication unit 25 is a communication function unit for communicating with the server device 10 via the mobile communication network 50 and the computer network 40.

Next, operations of the game system configured as above will be described using FIGS. 5 to 7.

Assume that, now, the first client device 20 is carried by the user who is at home and the second client device 30 is kept at the office of the user. Also, assume that the user who is at home wants to start a game.

Figure 5:
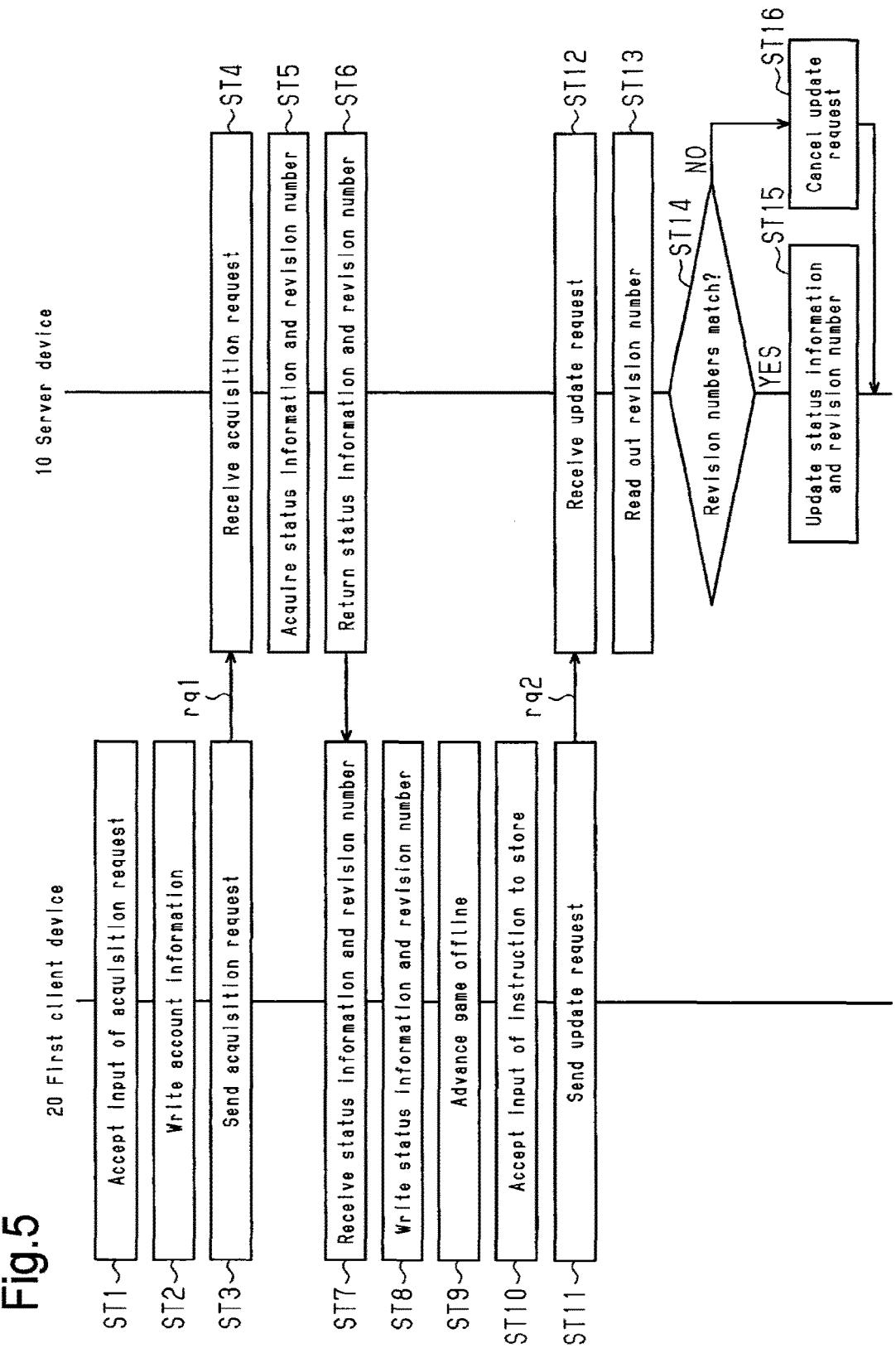
FIG. 5 is a sequence diagram for illustrating operations in the same embodiment.

At this time, in the first client device 20, as shown in FIG. 5, in response to an operation by the user, the acquisition request unit 22 accepts input of an acquisition request including account information of the user (ST1). The acquisition request unit 22 writes, into the storage unit 21, the account information included in the acquisition request the input of which has been accepted (ST2), and sends the acquisition request rq1 to the server device 10 (ST3).

In the server device 10, when the acquisition processing unit 12 receives the acquisition request rq1 (ST4), the unit 12 acquires status information and a revision number "n" from the storage unit 11 based on the account information in the acquisition request rq1 (ST5). The acquisition processing unit 12 returns the acquired status information and the revision number "n" to the first client device 20 serving as the source of the acquisition request rq1 (ST6).

In the first client device 20, the acquisition request unit 22 writes the status information and the revision number "n" received from the server device 10 into the storage unit 21 in response to sending of the acquisition request rq1 (ST7 to ST8).

Next, in the first client device 20, the game advance unit 23 advances the game in response to an operation by the user after restoring a status of the game based on the status information in the storage unit 21. Thereby, in response to the operation by the user, the game advances offline (ST9).

Assume that the user who is at home wants to stop the game after a while.

In the first client device 20, in response to an operation by the user, the update request unit 24 accepts input of an instruction to store the status of the game during advancement of the game (ST10). The update request unit 24 sends an update request rq2 including status information on a current status of the game, and the account information and the revision number "n" in the storage unit 21 to the server device 10 based on the instruction the input of which has been accepted (ST11).

In the server device 10, when the update processing unit 13 receives the update request rq2 (ST12), the unit 13 reads out the revision number "n" in the storage unit 11 based on the account information in the update request rq2 (ST13). The update processing unit 13 determines whether the read-out revision number "n" and the revision number "n" in the update request rq2 match each other (ST14). In a case where the numbers match each other as a result of the determination, the update processing unit 13 updates the revision number and the status information in the storage unit 11 based on the update request rq2 (ST15). In a case where the numbers do not match as a result of the determination of Step ST14, the update processing unit 13 cancels the update request rq2 (ST16). In this example, it is assumed that Step ST15 is executed and the storage unit 11 updates the revision number to a revision number "n+1" and the status information to status information on the status of the game at the time of Step ST10.

After Step ST15 or ST16 is finished, the game is stopped.

The above operations of Steps ST1 to ST16 are the same in a case where the second client device 30 is used in place of the first client device 20. That is, even in a case where the user leaves home and goes to his/her office for work after this and plays the game by using the second client device 30 at lunch break, the operations are executed in the same manner.

Next, a case where it is determined that the numbers do not match in Step ST14 (case where the revision numbers do not match) will be described. This corresponds to a case where the game is continuously executed through parallel execution by the respective client devices 20, 30 such as a case where while the game is being executed in one client device 20, the game is also restarted in another client device 30, and the game is stopped in the first client device 20 without being stopped in the other client device 30.

Figure 6:
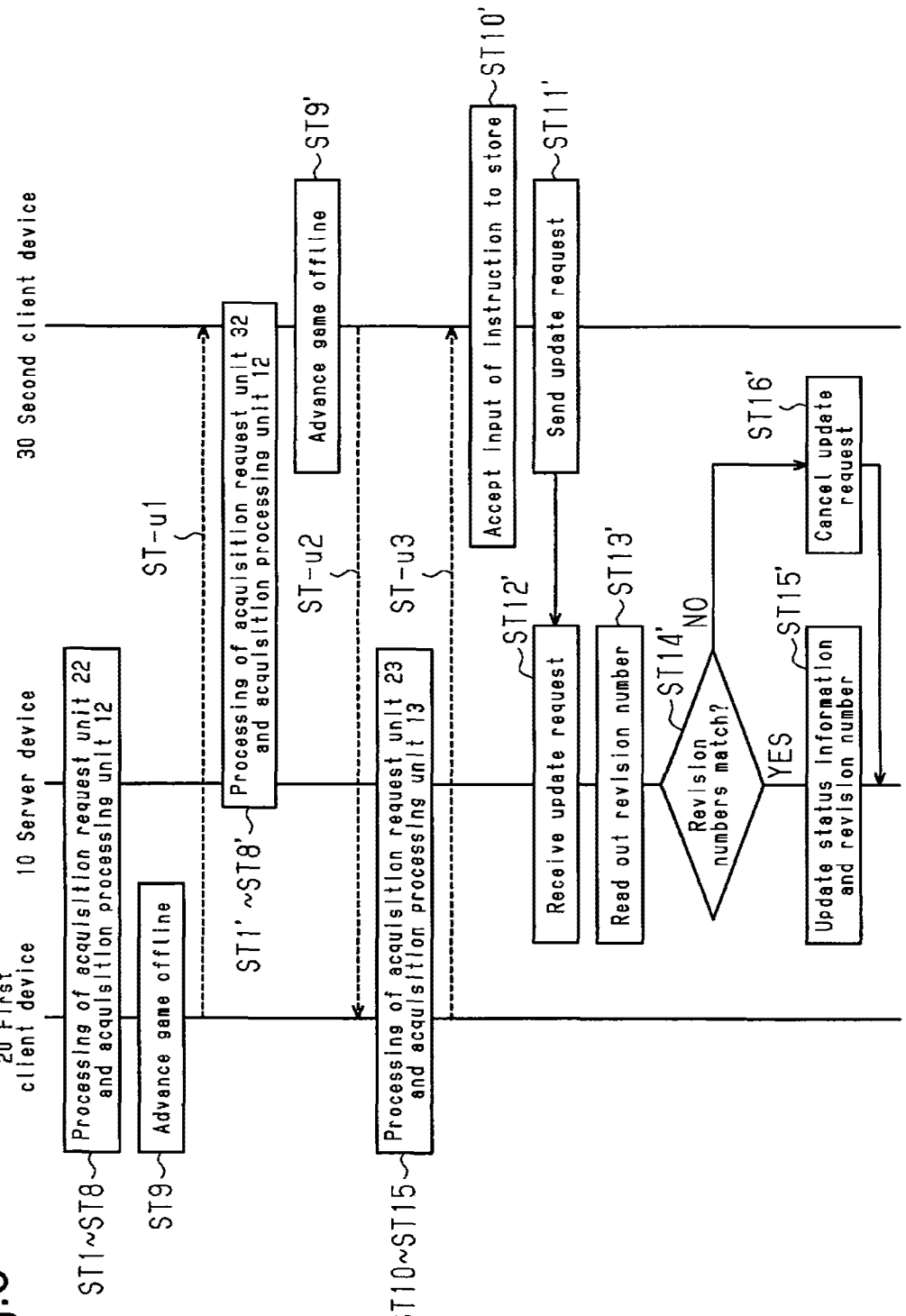
FIG. 6 is a sequence diagram for illustrating operations in the same embodiment.
Figure 7:
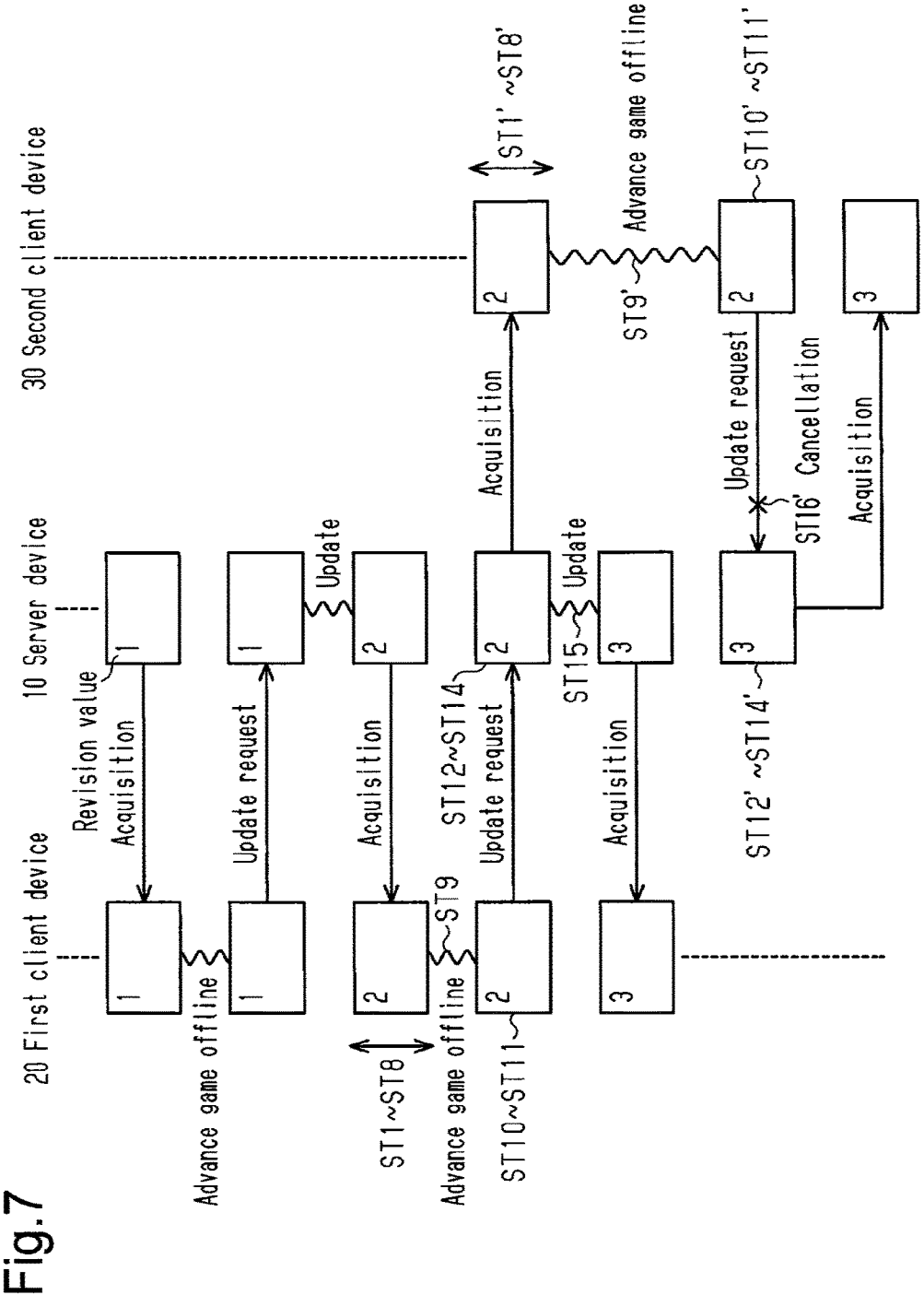
FIG. 7 is a schematic diagram for illustrating operations in the same embodiment.

In the first client device 20 and the server device 10, as shown in FIGS. 6 and 7, the above operations of Steps ST1 to ST8 are executed. Thereby, in the first client device 20, the status information and the revision number "n" received from the server device 10 are written into the storage unit 21 (ST8). This revision number "n" is assumed to be a revision number "2" in FIG. 7.

Next, in the first client device 20, the game advance unit 23 advances the game in response to the operation by the user after restoring the status of the game based on the status information in the storage unit 21. Thereby, in response to the operation by the user, the game advances offline (ST9).

Assume that the user who is at home leaves home without stopping the game in the first client device 20, and restarts the game by the second client device 30 outside home (ST-u1). Step ST-u1 indicates such a situation that the user who is at home falls asleep while playing the game with the first client device 20, gets up in the morning and goes to his/her office for work, and restarts the game by the second client device 30 at lunch break.

In the second client device 30 and the server device 10, operations of Steps ST1' to ST8' are executed in the same manner as in Steps ST1 to ST8. Thereby, in the second client device 30, the status information and the revision number "n" received from the server device 10 are written into a storage unit 31 (ST8').

Next, in the second client device 30, a game advance unit 33 advances the game in response to the operation by the user after restoring the status of the game based on the status information in the storage unit 31. Thereby, in response to the operation by the user, the game advances offline (ST9').

Assume that the user outside home comes home without stopping the game in the second client device 30, and continues the game by the first client device 20 at home (ST-u2).

In the first client device 20 and the server device 10, the above operations of Steps ST10 to ST15 are executed. Thereby, the storage unit 11 of the server device 10 updates the revision number to the revision number "n+1" and the status information to the status information on the status of the game at the time of Step ST10 (ST15). Assume that this revision number "n+1" is a revision number "3" in FIG. 7. After Step ST15 is finished, the game is stopped in the first client device 20.

Assume that the user who is at home goes out after that and continues the game by the second client device 30 outside home (ST-u3).

In the second client device 30, in response to an operation by the user, an update request unit 34 accepts input of an instruction to store the status of the game during advancement of the game (ST10'). The update request unit 34 sends an update request rq2 including status information on a current status of the game, and the account information and the revision number "n" in the storage unit 31 to the server device 10 based on the instruction the input of which has been accepted (ST11').

In the server device 10, when the update processing unit 13 receives the update request rq2 (ST12'), the unit 13 reads out the revision number "n+1" in the storage unit 11 based on the account information in the update request rq2 (ST13'). The update processing unit 13 determines whether the read-out revision number "n+1" and the revision number "n" in the update request rq2 match each other (ST14'). In a case where the numbers match each other as a result of the determination, the update processing unit 13 updates the revision number and the status information in the storage unit 11 based on the update request rq2 (ST15'). In a case where the numbers do not match as a result of the determination of Step ST14', the update processing unit 13 cancels the update request rq2 (ST16'). In this example, the numbers do not match, and the update request rq2 is cancelled (ST16').

After ST16' is finished, the game is stopped.

Next, in a case where the game is restarted in either the first or second client devices 20, 30, the revision number "n+1" (3) and the status information are to be received from the server device 10.

As described above, according to the present embodiment, the respective client devices 20, 30 acquire the status information in the server device 10, advance the game after restoring the game based on this status information, and updates the status information in the server device 10 at the time of stopping the game. Thereby, the game can be continuously executed between the respective client devices.

Also, the server device 10 stores the status information and the revision number while relating these to one another, updates the status information and the revision number in a case where the revision number in the update request and the revision number in the storage unit 11 match each other, and cancels the update request in a case where the revision numbers do not match. Thereby, even when the game is executed in parallel by the respective client devices, the status information to be stored in the server device 10 can be consistent (in such a manner that precedence is given to the latest revision number). Therefore, the game can be continuously executed through parallel execution by the respective client devices.

Further, in a case where the status information excludes information on platforms of the respective client devices 20, 30, the above advantages can be obtained without depending on the platforms of the respective client devices 20, 30. That is, even in a case where the user uses the respective client devices 20, 30 having different platforms from each other, the above advantages can also be obtained.

Second Embodiment

Next, a game system according to a second embodiment of the present invention will be described with reference to the drawings described above.

Figure 8:
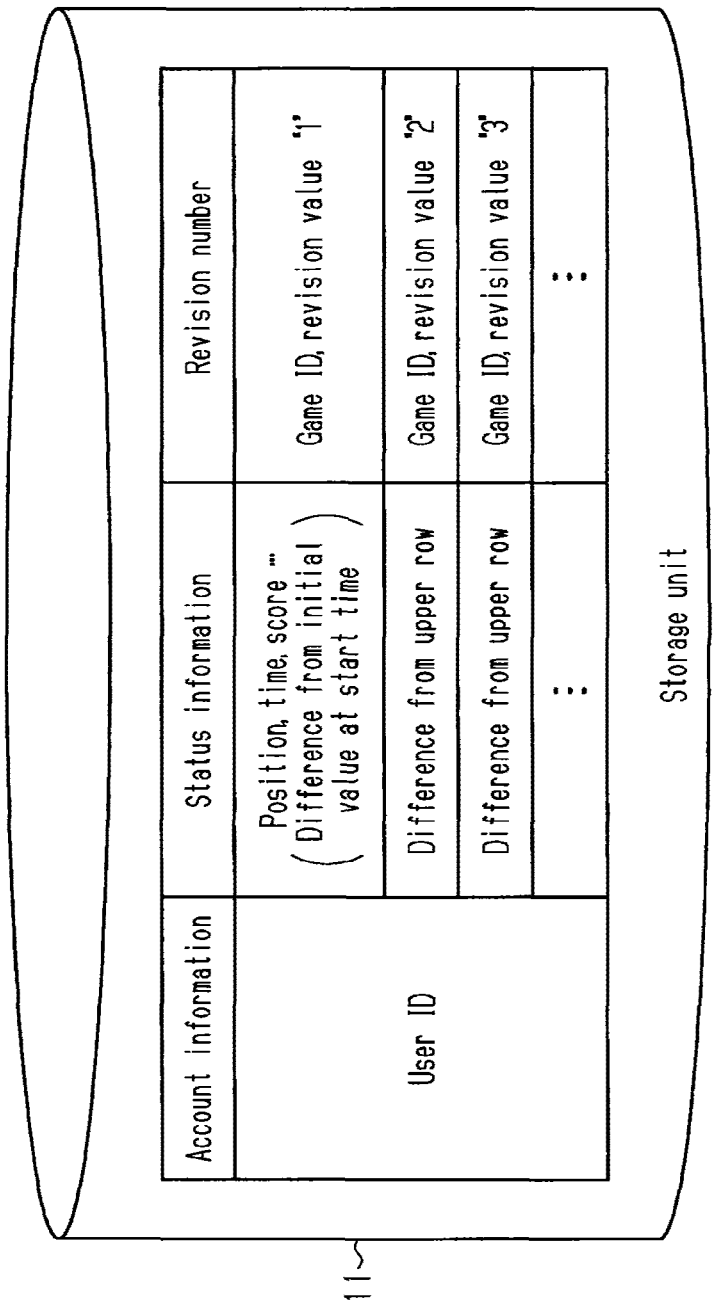
FIG. 8 is a schematic diagram for illustrating a storage unit of a server device in a second embodiment of the present invention.

The second embodiment is a modification of the first embodiment. As shown in FIG. 8, the status information in the storage unit 11 of the server device 10 is difference information on a difference from the status information relating to the previous revision number.

Accordingly, the acquisition function (f12-1) in the acquisition processing unit 12 and the update function (f13-4) in the update processing unit 13 in the server device 10 are formed by respective functions as follows.

That is, the acquisition function (f12-1) of the acquisition processing unit 12 is the function of, when the acquisition request rq1 including the account information is received from each of the client devices 20, 30, acquiring the status information and the revision number from the storage unit 11 based on the account information in the acquisition request rq1 as described above.

However, in the second embodiment, this acquisition function (f12-1) has the following respective functions (f12-1-1) and (f12-1-2).

(f12-1-1) Function of acquiring the status information by accumulating all difference information in the storage unit 11 based on the account information in the acquisition request rq1.

(f12-1-2) Function of acquiring the latest revision number in the storage unit 11 based on the account information in the acquisition request.

The update function (f13-4) of the update processing unit 13 is the function of updating the revision number and the status information in the storage unit 11 based on the update request rq2 in a case where the numbers match each other as a result of the determination (to determine whether the revision numbers match/do not match) as described above.

In the second embodiment, this update function (f13-4) has the following respective functions (f13-4-1) to (f13-4-4).

(f13-4-1) Function of calculating the status information by accumulating all difference information in the storage unit 11 based on the account information in the update request.

(f13-4-2) Function of calculating the difference between the status information in the update request and the calculated status information.

(f13-4-3) Function of additionally storing the revision number obtained by updating the latest revision number in the storage unit 11 in the storage unit 11.

(f13-4-4) Function of writing the calculated difference into the storage unit 11 as status information, while relating the status information to the additionally stored revision number.

Further, the configurations of the respective client devices 20, 30 and the other respective units 11, 14 of the server device 10 are as described above. The respective functions of the acquisition processing unit 12 other than the acquisition function (f12-1) are as described above. The respective functions of the update processing unit 13 other than the update function (f13-4) are also as described above.

According to the above configurations, in Step ST5 described above, as shown in FIG. 9, the acquisition processing unit 12 of the server device 10 acquires the status information by accumulating all difference information in the storage unit 11 based on the account information in the acquisition request rq1 (ST5-1), and acquires the latest revision number in the storage unit 11 based on the account information in the acquisition request (ST5-2). That is, Step ST5 described above is executed by Steps ST5-1 to ST5-2.

In Step ST15 described above, the update processing unit 13 of the server device 10 calculates the status information by accumulating all difference information in the storage unit 11 based on the account information in the update request (ST15-1), and calculates the difference between the status information in the update request and the calculated status information (ST15-2). Further, the update processing unit 13 additionally stores the revision number obtained by updating the latest revision number in the storage unit 11 in the storage unit 11 (ST15-3), and writes the calculated difference into the storage unit 11 as status information while relating the status information to the additionally stored revision number (ST15-4). That is, Step ST15 described above is executed by Steps ST15-1 to ST15-4.

The other Steps ST1 to ST4, ST6 to ST14, ST16 are executed in the same manner as in the above description.

Therefore, according to the second embodiment, even in a case where the status information in the storage unit 11 of the server device 10 is the difference information on the difference from the status information related to the previous revision number, the same advantages as those of the first embodiment can be obtained.

The method described in the above embodiments can be stored in a storage medium such as a magnetic disk (Floppy (Registered Trademark) disk, hard disk, and the like), an optical disc (CD-ROM, DVD, and the like), a magneto-optical disc (MO), and a semiconductor memory and distributed as a program that can be executed by a computer.

The invention of the present application is not limited to the above embodiments. However, in an implementation stage, the constituent elements can be modified and embodied within the range not departing from the gist of the invention of the present application. By appropriately combining a plurality of constituent elements disclosed in the above embodiments, various inventions can be formed. For example, some constituent elements may be deleted from all of the constituent elements shown in the embodiments. Further, the constituent elements for the different embodiments may be combined as necessary.

The invention claimed is:

1. A server configured to communicate with each of a plurality of client devices configured to progress a game in response to an operation by a user, the server comprising:
   circuitry configured to
      receive a retrieval request including account information of the user from a first client device of the plurality of client devices;
      calculate first status information by accumulating difference information of status of the game stored by the server, in response to the retrieval request, the difference information being associated with the account information of the user;
      send the first status information to the first client device;
      receive an update request including second status information and account information of the user from a second client device of the plurality of the client devices;
      calculate third status information by accumulating the difference information stored by the server, based on the account information included in the update request;
      calculate a difference between the second status information included in the update request and the third status information; and
      store the difference as new difference information.

2. The server according to claim 1,
   wherein the circuitry is further configured to
      store a revision number in association with the first status information and the account information of the user, in response to the retrieval request; and
      update the revision number to latest revision number and store the latest revision number, in addition to calculating the difference between the second status information in the update request and the third status information, in response to the update request.

3. The server according to claim 2, wherein the circuitry is further configured to
- send a first revision number in association with the first status information to the first client device, in response to the retrieval request;
- receive a second revision number in association with the second status information and the update request, from the second client device:
- accept the update request from the second client device and calculate the difference based on the second status information, when the second revision number included in the update request matches the first revision number stored by the server; and
- update the revision number to the latest revision number.

4. The server according to claim 3, wherein the circuitry is further configured to reject the update request from the second client, when the second revision number included in the update request does not match the first revision number stored by the server.

5. A non-transitory computer-readable storage medium, including computer-program instructions, which when executed by a server that is configured to communicate with each of a plurality of client devices, the plurality of client devices being configured to progress a game in response to an operation by a user, cause the server to:
- receive a retrieval request including account information of the user from a first client device of the plurality of client devices;
- calculate first status information by accumulating difference information of status of the game stored by the server, in response to the retrieval request, the difference information being associated with the account information of the user;
- send the first status information to the first client device;
- receive an update request including second status information and account information of the user from a second client device of the plurality of the client devices;
- calculate third status information by accumulating the difference information stored by the server, based on the account information included in the update request;
- calculate a difference between the second status information included in the update request and the third status information; and
- store the difference as new difference information.

6. The non-transitory computer-readable storage medium according to claim 5, wherein the computer-program instructions, when executed by the server, cause the server to:
- store a revision number in association with the first status information and the account information of the user, in response to the retrieval request; and
- update the revision number to latest revision number and store the latest revision number, in addition to calculating the difference between the second status information in the update request and the third status information, in response to the update request.

7. The non-transitory computer-readable storage medium according to claim 6, wherein the computer-program instructions, when executed by the server, cause the server to:
- send a first revision number in association with the first status information to the first client device, in response to the retrieval request;
- receive a second revision number in association with the second status information and the update request, from the second client device:
- accept the update request from the second client device and calculate the difference based on the second status information, when the second revision number included in the update request matches the first revision number stored by the server; and
- update the revision number to the latest revision number.

8. The non-transitory computer-readable storage medium according to claim 7, wherein the computer-program instructions, when executed by the server, cause the server to:
- reject the update request from the second client, when the second revision number included in the update request does not match the first revision number stored by the server.

9. A method performed by a server that is configured to communicate with each of a plurality of client devices, the plurality of client devices being configured to progress a game in response to an operation by a user, the method comprising:
- receiving a retrieval request including account information of the user from a first client device of the plurality of client devices;
- calculating first status information by accumulating difference information of status of the game stored by the server, in response to the retrieval request, the difference information being associated with the account information of the user;
- sending the first status information to the first client device;
- receiving an update request including second status information and account information of the user from a second client device of the plurality of the client devices;
- calculating third status information by accumulating the difference information stored by the server, based on the account information included in the update request;
- calculating a difference between the second status information included in the update request and the third status information; and
- storing the difference as new difference information.

10. The method according to claim 9, further comprising:
- storing a revision number in association with the first status information and the account information of the user, in response to the retrieval request; and
- updating the revision number to latest revision number and store the latest revision number, in addition to calculating the difference between the second status information in the update request and the third status information, in response to the update request.

11. The method according to claim 10, further comprising:
- sending a first revision number in association with the first status information to the first client device, in response to the retrieval request;
- receiving a second revision number in association with the second status information and the update request, from the second client device:
- accepting the update request from the second client device and calculate the difference based on the second status information, when the second revision number included in the update request matches the first revision number stored by the server; and
- updating the revision number to the latest revision number.

12. The method according to claim 11, further comprising:

rejecting the update request from the second client, when the second revision number included in the update request does not match the first revision number stored by the server.

13. A client device configured to communicate with a server and to progress a game in response to an operation by a user, the client device comprising:

circuitry configured to transmit a retrieval request including account information of the user to the server;

receive first status information from the server, the first status information being calculated by accumulating difference information of status of the game stored by the server, in response to the retrieval request, and the difference information being associated with the account information of the user;

progress the game after restoring the status of the game based on the first status information; and send, to the server, an update request including the account information of the user and second status information on the current status of the game based on an instruction from the user, the second status information being used for calculating new difference information by the server.

14. The client device according to claim 13, wherein a revision number, in association with the first status information and the account information of the user, is stored by the server, in response to the retrieval request, and wherein the revision number is updated to latest revision number and the latest revision number is stored by the server, in response to the update request.

* * * * *